United States Patent [19]

Meyer

[11] Patent Number: 4,627,039
[45] Date of Patent: Dec. 2, 1986

[54] HEAD POSITIONING SERVO SYSTEM FOR OPTICAL RECORDING WITH COARSE AND FINE CONTROL

[75] Inventor: Russell A. Meyer, Colorado Springs, Colo.

[73] Assignee: Magnetic Peripherals Inc., Minneapolis, Minn.

[21] Appl. No.: 564,656

[22] Filed: Dec. 23, 1983

[51] Int. Cl.⁴ .............................................. G11B 7/00
[52] U.S. Cl. ...................................................... 369/44
[58] Field of Search .................................. 369/43–46, 369/32, 33; 358/342; 250/201–204

[56] References Cited

U.S. PATENT DOCUMENTS

| | | | |
|---|---|---|---|
| 3,725,764 | 4/1973 | Oswald | 318/629 |
| 3,854,015 | 12/1974 | Janssen | 179/100.3 V |
| 3,924,268 | 12/1975 | McIntosh et al. | 360/78 |
| 3,969,574 | 7/1976 | Janssen et al. | 178/6.6 R |
| 4,004,081 | 1/1977 | Zorn | 369/44 X |
| 4,034,403 | 7/1977 | Compaan et al. | 358/128 |
| 4,498,158 | 2/1985 | Akiyama | 369/32 |
| 4,536,863 | 8/1985 | Giddings | 369/44 X |

FOREIGN PATENT DOCUMENTS 2029051 3/1980 United Kingdom .

*Primary Examiner*—Robert L. Richardson
*Attorney, Agent, or Firm*—Joseph A. Genovese; Michael B. Atlass; William J. McGinnis, Jr.

[57] ABSTRACT

An optical recording system has a system optical apparatus carried by a fine tracking system which moves the optical apparatus for small track seeking movements and for track following. The fine tracking system is carried by a linear actuator coarse tracking system which makes large track seeking movements so that the entire area of the optical recording media is available to the system. Both the coarse tracking system and the fine tracking system are operated by servo control loops. The fine tracking system responds to tracking status signals with respect to track following and track seeking signals in response to track addressing information. The coarse tracking system responds to position sensor signals derived from a position sensor which is associated with the fine tracking system and provides signals related to the relative position of the fine tracking system to the coarse tracking system. The coarse tracking system follows the movements of the fine tracking system using signals from the position sensing system as the only necessary control for the coarse tracking system.

17 Claims, 2 Drawing Figures

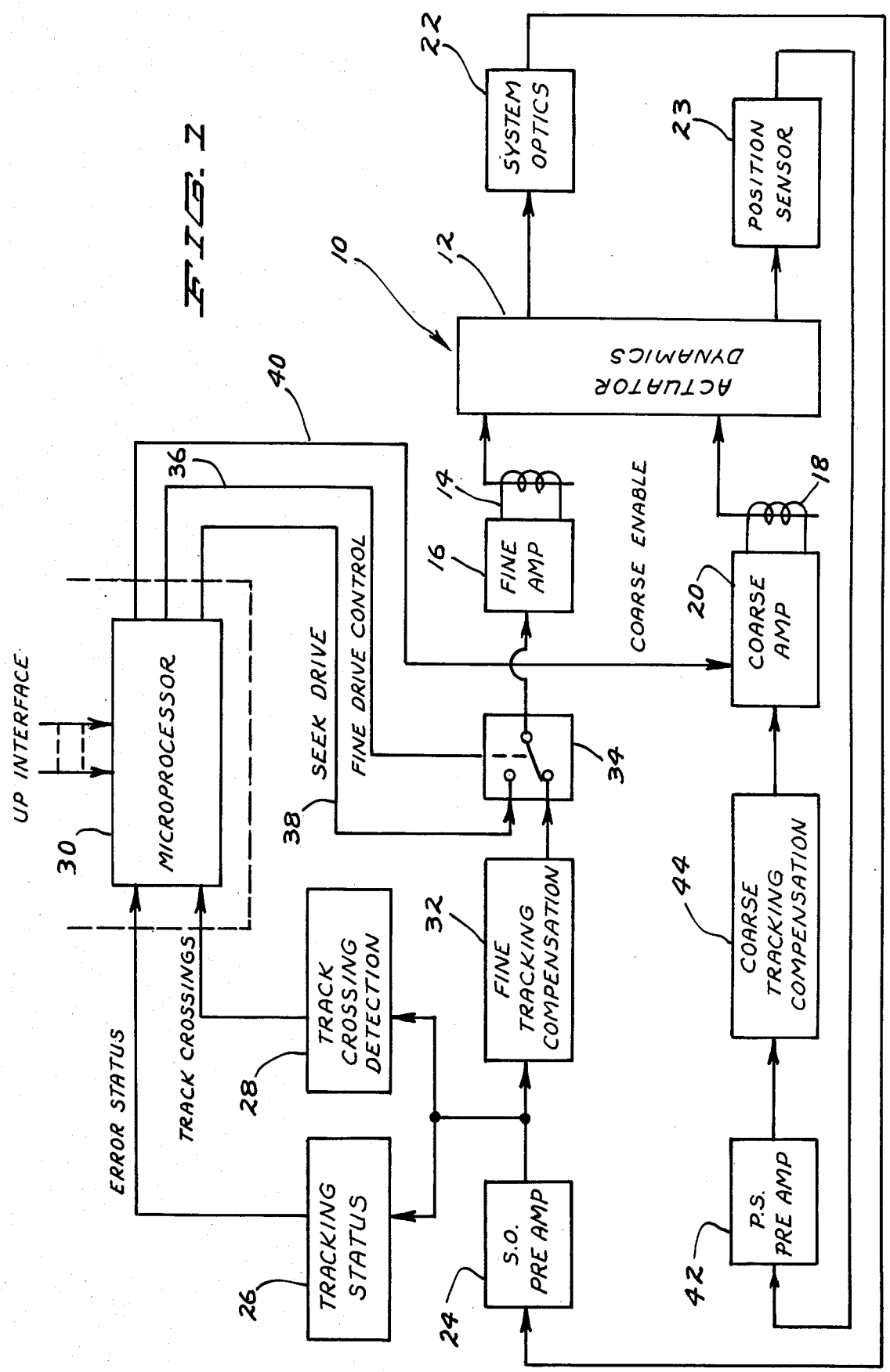

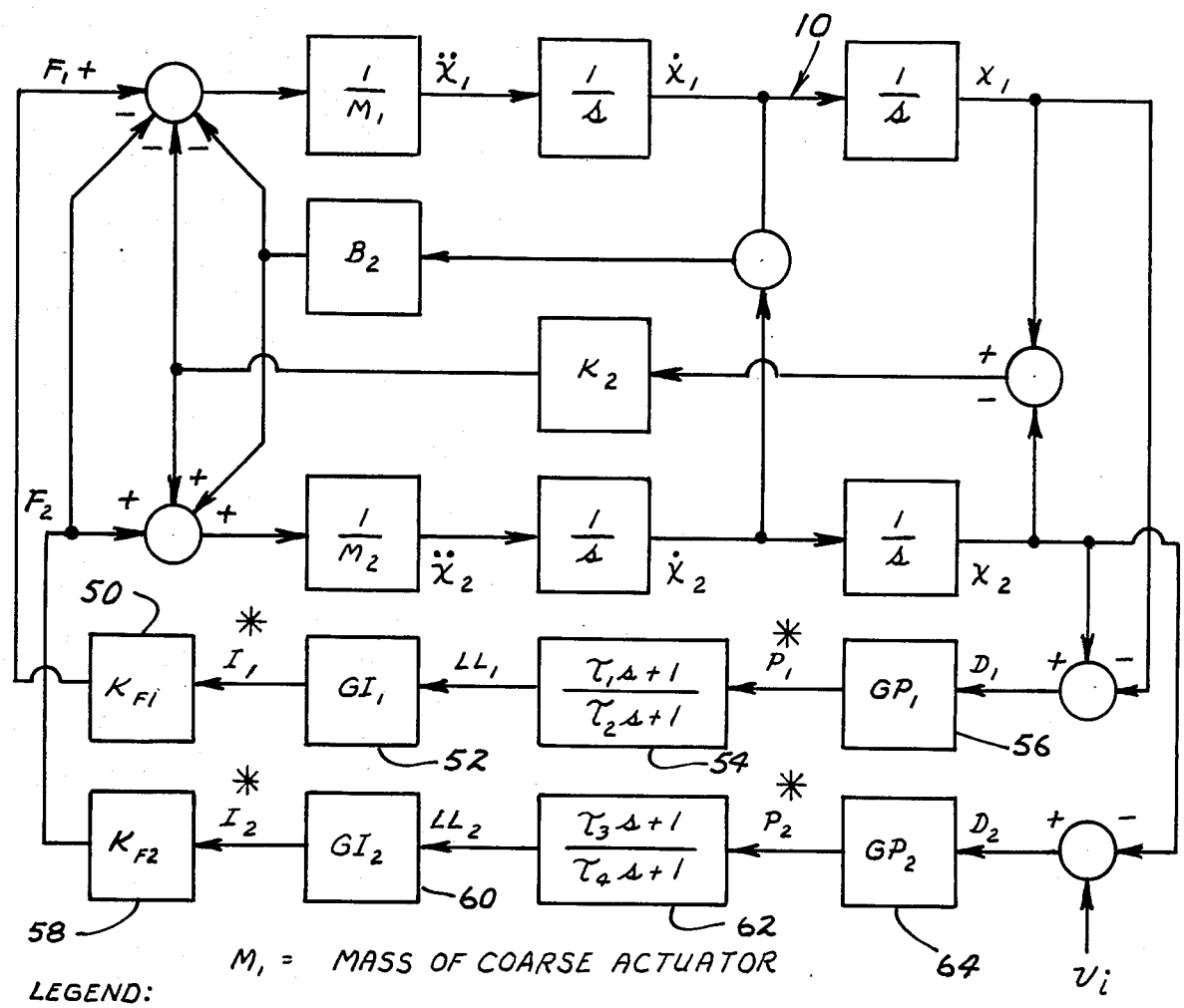

FIG. 2

LEGEND:
- $M_1$ = MASS OF COARSE ACTUATOR
- $K_{F1}$ = FORCE COEF. OF COARSE ACT.
- $GI_1$ = CURRENT AMP. GAIN OF COARSE ACT. *
- $\tau_1, \tau_2$ = LEAD-LAG OF COARSE ACT.
- $GP_1 = \dfrac{C_1}{K_{F1} \cdot GI_1}$ = COARSE PRE-AMP GAIN *
- $C_1$ = COARSE LOOP GAIN
- $M_2$ = MASS OF FINE ACTUATOR
- $B_2$ = FRICTION COEF. OF FINE ACT.
- $K_2$ = SPRING COEF. OF FINE ACT.
- $K_{F2}$ = FORCE COEF. OF FINE ACT.
- $GI_2$ = CURRENT AMP GAIN OF FINE.ACT. *
- $\tau_3, \tau_4$ = LEAD-LAG OF FINE ACT.
- $GP_2 = \dfrac{C_2}{K_{F2} \cdot GI_2}$ = FINE PRE-AMP GAIN *
- $C_2$ = FINE LOOP GAIN

HEAD POSITIONING SERVO SYSTEM FOR OPTICAL RECORDING WITH COARSE AND FINE CONTROL

BACKGROUND OF THE INVENTION

The present invention relates to optical recording systems. In particular, the present invention relates to systems for positioning the optical apparatus which follows a particular data track on the optical recording media in a desired position on a particular track of the optical recording media and for moving that optical apparatus from one track position to another. This invention is not, however, limited in scope to optical recording and may also find application in high density magnetic recording and other applications where a large area must be accessed with precision in a short time interval.

Prior art systems for positioning optical apparatus in optical recording media typically depends upon fine movements of an optical lens system in dimensions of a comparatively few track spaces with respect to the media by a first system. The first system is in turn mounted and carried by some type of carriage assembly or second system for comparatively large track movements with respect to recording media so that the entire recording media is accessed. It is necessary to control both movement of the first system and of the second system. In some prior art systems the first system is used for fine tracking of a particular track on the recording media in a track following mode when a track is being accessed. The large movement or coarse track accessing system is used for movements from one track to another. The fine tracking system is controlled in the prior art by an optically actuated servo loop mechanism which develops servo positioned error signals directly from optical signals received from the media. In such prior art systems, the coarse actuator system is controlled by track accessing signals developed from the present track address location and a differential signal developed with respect to the desired track location. Such signals are sometimes used in association with a fixed position indicator reticle which provides a position reference indication of the coarse actuator system with respect to the fixed framework of the optical recording system. Such signals may be comparatively inaccurate compared to the very high track densities achieved in optical recording systems and compared with the speed and accuracy with which it is necessary to move from one track to another track in accessing data in optical recording systems.

Therefore, there is a need for an improved optical recording track following and track seeking control system to quickly and reliably cause a controlled movement of the optical apparatus from a first position to a second position.

U.S. Pat. No. 3,969,574 issued July 13, 1976 shows an optical recording system in which position information for the optical elements is developed from a reference signal between the moving actuator mechanism and the stationary framework or chassis assembly of the optical apparatus.

United Kingdom Patent Application No. 2,029,051, published Mar. 12, 1980, shows a single servo loop system for controlling the positioning of the optical apparatus in optical recording together with a second servo control loop based on a position indicator which senses the radial position of the optical apparatus with respect to the optical recording media should the first servo control loop fail. The primary servo control loop maintains track position based on a combination of track addressing information and track following information provided optically from the recording media.

U.S. Pat. No. 4,034,403 shows an optical recording system in which an optical positioning control system develops both a coarse positioning signal and a fine positioning signal using the same optical information derived from the optical recording media. Optical gratings are used to develop the information signals.

None of the foregoing systems relating to optical recording show or anticipate a system according to the present invention where a control system for head positioning in an optical recording system is controlled by two servo control loops where the first control loop receives track following and track seeking servo control information and where the second servo control loop controls coarse positioning of the optical system solely by position sensing signals of the relative position of the second system to that of the first system.

In the magnetic recording control system art, there are servo control systems known for use with high-density track following requirements. Because the optical recording art also relates to high-density track following systems and because other elements of the technology may be considered pertinent, the relevant prior art also includes such control systems. For example, U.S. Pat. No. 3,924,268 shows a control system for positioning a magnetic disk transducer head including a primary carriage for coarse positioning and a secondary low-mass carriage riding on the first carriage in order to position a magnetic recording head relative to a magnetic recording medium. By supporting a secondary low-mass carriage on a primary coarse positioning carriage, the patent shows that highly accurate extremely fast response can be achieved over small distances. However, the patent shows that the control system works by simultaneously and continuously controlling both carriages in response to a single position error control signal with a secondary carriage being biased toward a zero displacement position relative to the primary carriage. The system shown in the patent uses position detection and velocity detection in order to provide servo control signals for the primary and secondary actuators. The patent does not teach the use of a control system for controlling the coarse positioning actuator solely by means of the relative position of the secondary or fine actuator with respect to that of the coarse position or primary actuator as does the present invention. Therefore, this patent does not show or anticipate the teachings of the present invention.

U.S. Pat. No. 3,725,764 shows position and velocity detection for controlling a servo motor mechanism in order to follow a servo track on a moving surface of a magnetic disk memory. This patent does not show or anticipate the present invention but is cited to show the state of the prior art.

SUMMARY OF THE INVENTION

The present invention is a servo control system for an optical recording system. The optical recording system consists of a low-mass fine positioning actuator or motor carrying the system optical components and electronics for recording and playback. The fine positioning actuator and system optics are mounted on a primary or coarse positioning actuator which carries the fine positioning actuator and optical system linearly back and forth in a direction which is radial to the rotating optical media disk.

Two servo control loops are used, one associated with the fine positioning system and the other associated with the coarse positioning system. The fine positioning actuator is controlled in two modes of operation, the first is a track following mode where a particular data track on the optical recording media is followed and the fine actuator makes small movements to follow the data track allowing for various irregularities in track position and wobble affects in the drive mechanism. The second mode of operation of the control system for the fine actuator is a track seeking mode where the system is caused to move from one track location to another. This presupposes a track addressing system where each track of many thousands on an optical recording medium has a unique address and this practice has become customary with respect to optical recording as well as magnetic recording arts.

The primary or coarse actuator is controlled by a position sensor which provides information with respect to the relative position between the fine actuating system and the coarse actuating system. In practice, this position sensor consists of a moveable flag type element on the fine actuator which interrupts a light beam transmitter and receiver system mounted in a fixed position on the coarse actuator assembly. Depending upon the amount of light interrupted and the direction of movement of the flag interrupting the light beam, the position sensing system provides an indication of the direction and the amount of travel of the fine positioning actuator with respect to the coarse positioning actuator. From this position sensing signal, an appropriate signal is generated to drive the coarse positioning actuator to an appropriate changed location.

The coarse actuating system does not need to have additional or different input relating to either its velocity of travel or the relative position of the coarse actuator with respect to the stationary chassis or framework assembly of the optical recording system. Sufficient information is obtained from the magnitude and direction indication of the position sensor signal relating to the relative position difference between the fine actuator and the coarse actuator so that the coarse actuator in effect follows the fine actuator in any necessary travel from one track position to another. The coarse actuator operates at a comparatively lower frequency and longer time constant so that it does not attempt to follow high frequency fast movements of the fine position actuator as it makes comparatively small movements in track following.

In order to make large movements from one track to another track address location, the fine actuator moves to its stop limit in the appropriate direction causing the maximum position error signal to be provided to the coarse actuator servo drive system. The maximum position error signal drives the coarse positioning servo actuator mechanism to its highest rate of travel in the appropriate direction. As the system approaches the desired new track location, the fine actuator moves from its maximum displacement position in effect controlling the coarse actuator to a slower movement and eventually to a stop position.

Because of the mass of the larger coarse actuator system, it may take a little extra movement in order to settle down at the desired new track location. However, the fine positioning system has sufficient movement capabilities that it may lock onto a new track location and follow the new data track during the time that the coarse actuator settles to its final position which is a position showing no position deviation from a desired zero or center position on the position sensor.

Copending application Ser. No. 06/448,130, filed Dec. 9, 1982, and entitled, "Two Axis Linear Motor for Optical Focusing and Tracking System in Optical Recording," shows an appropriate fine positioning linear motor actuator system which may be used with the servo control system described in the present application. The referenced application is owned by the same assignee as the present application and the entire contents of that application are incorporated into this application by reference for the purpose of showing an appropriate fine actuator system and position sensor system.

IN THE FIGURES

FIG. 1 is a system diagram of a dual actuator servo control system according to the present invention for properly positioning a reading mechanism over the media according to the present invention.

FIG. 2 is a system function diagram of a dual actuator servo control system according to the present invention.

DESCRIPTION OF THE PREFERRED EMBODIMENTS

Track addressing and track seeking or location is an important and essential function in optical recording techniques. At the present time, optical recording technology anticipates a track-to-track spacing on the order of 1.6 $\mu$m. This track density as well as other parameters of optical recording requiring tracking accuracy of the optical system with respect to the track on the order of 0.1 $\mu$m. This accuracy along with the run-out which exists on optical media of a reasonably producible quality and which may be replaced in the optical recording system make a simple single linear actuator not feasible. It is required to maintain 0.1 $\mu$m. accuracy and still be able to randomly access data tracks in a 50 mm. range across an optical recording disk. There are tens of thousands of tracks on each optical recording disk.

The very large track densities found in optical recording requires that servo information for controlling optical positioning for both tracking and track seek functions must come from the optical recording media. Thus, each track must have a unique address and track counting is employed in moving from one track location to another. Accordingly, the optics of such an optical recording system must be able to detect and measure each data track as it is crossed. It has been found that with the optical technology presently envisioned that this is possible.

Referring now to FIG. 1, a servo control system 10, according to the present invention, is shown for an optical recording system. The optical system, including optical elements and electronic components, for reading and writing data on optical media is carried by a fine actuator of comparatively low mass which is mounted on a coarse actuator of comparatively high mass. The physical characteristics of the small mass fine actuator acting against the larger mass coarse positioning actuator, which in turn acts with respect to the fixed chassis or framework of the optical recording system, is all represented in FIG. 1 by the actuator dynamics block 12.

The fine actuator is controlled by a linear motor represented at 14, which in turn receives the electrical current for its drive from a fine positioning amplifier 16. The coarse positioning actuator is driven by a linear motor represented at 18, which in turn receives the electrical current for its drive from a coarse positioning amplifier 20. The system optics 22 reads and writes data from optical media and produces both data from the media, such as the particular track address, as well as track counting or track crossing information and track positioning information. The system position sensor 23 functions to provide both a direction indication oriented radially with respect to the optical recording disk and in the same linear direction as the travel of the coarse positioning actuator, as well as a magnitude indication indicating the extent to which the fine positioning actuator has moved from an arbitrary zero position with respect to the coarse positioning actuator reference frame. A spring force may be used to center the fine positioning actuator.

The output of the system optics function 22 is provided to a system optics pre-amp 24. The system optics pre-amp 24 has outputs connected to a tracking status functional system 26, as well as a track crossing detection functional system 28. The tracking status functional system 26 provides indications both as to direction and magnitude of the control necessary to cause the optics to follow the wobble or other characteristics of a particular data track. The tracking status functional block 26 provides an error status signal to a microprocessor 30. The track crossing detector 28 provides a count of the number of tracks crossed in a track seeking function, and this output is also provided to microprocessor 30.

For example, if the data track presently being accessed is numbered 10,000, and it is desired to access data track 12,000, the system is caused to move and the track crossing detector counts the 2,000 tracks necessary before the next track is accessed, and the track address read to confirm that it is the desired track. Microprocessor 30 provides track counting and track accessing functions so that the system is able to move under control signals that correlate to the necessary movement from a first position to another position.

The system optics pre-amp 24 is also connected to a fine tracking compensation functional system 32, which is an analog servo control loop which provides output signals to control the fine amplifier 16. Switch 34 which is electrically operated by the microprocessor 30 through control channel 36 connects the fine tracking compensation signal 32 to the amplifier 16 during an access mode when a single data track is being accessed. At times when a new data track is being accessed from a presently accessed data track, the fine drive control channel 36 causes switch 34 to be connected to the seek drive control channel 38. The seek drive control channel 38 drives the fine amplifier control unit 16 in the required direction and magnitude to cause linear motor 14 to displace the fine actuator system so as to cause the optical system to move towards the desired new data track.

Microprocessor 30 also has a control channel 40 to coarse amplifier 20 for controlling track seeking functions of comparatively large address locations of many hundreds or thousands of tracks. Normally, position sensor 23 provides an output magnitude and direction signal to the position sensor pre-amp 42, which provides an error signal to control the coarse tracking compensation servo system 44. The coarse tracking compensation servo system 44 produces an output signal which is used to control the coarse position amplifier 20 so that the coarse position actuator follows the optical system to the appropriate new location.

Referring now to FIG. 2, a servo system 10 according to the present invention is shown in system diagram form. The boxes are labeled with the system functions represented and the legend shows how the system works. The system function diagram is comparatively self-explanatory. Standard terminology for servo loop analysis is used. The coarse actuator 50 is shown connected to its drive amplifier 52. The system function in box 54 represents system characteristics, while the pre-amplifier is represented by box 56. Similarly, the fine actuator is represented at 58, while the fine actuator drive amplifier is represented at 60, the system characteristic at 62, and the fine drive pre-amplifier at 64. The other characteristics of the system are shown as labeled with the subscript 1 referring to the coarse actuator and the subscript 2 referring to the fine actuator. The system is modeled as a small mass fine actuator relating to a larger mass coarse actuator having a spring coefficient K and a friction coefficient B. The fine actuator drive produces a force F. Similarly, the coarse actuator is modeled as a larger mass, having an actuator which produces a force on it with respect to the framework of the optical recording system. The microprocessor 30 shown in FIG. 1 relates all distances in the system to distance between a desired track location and the actual track location. Thus, although the position sensor senses the relative position between the coarse actuator and the fine actuator, the microprocessor computes a distance between actual location and desired location.

The fine actuator is a small spring mass actuator which is biased to a zero position in the radial direction with respect to the rotating optical media by springs. The fine actuator driving force and the coarse actuator driving force are controlled independently. All of the mechanical configuration is embodied in the actuator dynamics block 12 of FIG. 1.

Two sets of error signals are generated, the system optics error signal and the position sensor error signal. The system optics block uses embedded servo information in the optical media, including track addressing and track crossing characteristics based on the modulation method involved. The error signal generated by the system optics blocks represents the spacing differences between the fine actuator and the track to be followed. The second error signal is generated by the position sensor block relating the fine actuator to the coarse actuator. The position sensor block 23 measures the relative spacing of the two actuators.

During the tracking mode, the position sensor is used to control the coarse actuator. The servo loop for the coarse actuator is stabilized by a lead-leg network in the coarse tracking compensation system 44. As a result, the coarse actuator follows the movements of the fine actuator. The error signal from the system optics 22 is used to control the fine actuator 14 and the servo loop 32 for the fine tracking system is stabilized with a lead-leg network. The overall tracking loop configuration is diagrammed in FIG. 2. Although the mechanical systems are coupled, the effective loop characteristic for the fine actuator is significantly different than that of the coarse actuator. The different servo loop characteristics inhibit undesired loop interactions so that the system is stable. The resultant tracking system allows the fine position actuator to follow large run-outs of data tracks on the optical media at comparatively high frequencies. The coarse actuator only reacts to comparatively low frequency variations, essentially only those required by moving from one track to another.

During track seek operations, the coarse actuator continues to follow the motions of the fine actuator. The fine actuator is driven by a microprocessor to the desired track. Referring again to FIG. 1, the tracking error signal from the system optics unit 22 is used to detect track crossings. The track crossings count is fed into the microprocessor 30. The microprocessor measures the time between track crossings in order to determine system optics velocity. These calculations are standard calculations and are made in the microprocessor. The microprocessor determines the distance between the track to be accessed and the present track location. Calculating the change in distance divided by the change in time, the microprocessor generates the average velocity of the fine actuator. The microprocessor 30 also determines the number of tracks to go before the desired new track location. The number of tracks remaining is used to generate the desired velocity control signal from a velocity trajectory or profile stored in memory. The difference between the average velocity and the desired velocity generates a velocity error signal. Microprocessor 30 outputs the velocity error signal to a digital to analog convertor that drives the fine actuator amplifier 16 using control channel 38 with switch 34 in the appropriate position. Large track seek operations result in high velocities over large distances from the desired track and require a continual reduction in velocity until the desired track is actually reached. When the desired track is reached, the fine actuator 16 is returned to the fine tracking mode by operation of switch 34 to use the output of the fine tracking compensation servo 32 to control amplifier 16. The microprocessor 30 always monitors the error signal status derived from the system to determine that a stable tracking state exists.

Maintaining the tracking accuracy with a high band width fine actuator servo control loop allows the coarse actuator servo control loop to be of a comparatively low band width. An order of magnitude of servo control loop band width separation allows the two servo control loops to be stabilized independently using standard servo control loop analysis. Although both servo control loops could be stabilized with the tracking error signal from the system optics function 22, the additional position sensing unit 23 is useful for track seeking reasons. The position sensor 23 measures the relative positions of the coarse and fine actuators and is used to stabilize the coarse positioning servo control loop during track seeking functions. The fine position servo control loop is stabilized with the tracking error signal derived from the system optics.

Selection of system function values for the two servo loops can for the most part be performed using conventional servo loop techniques. The fine actuator as a spring mass system and the coarse positioning linear actuator should both have lead-leg compensation as well as high frequency roll-off characteristics. To minimize unnecessary system interactions, both servo loops should have comparatively large phase margins to reduce oscillation tendencies. The gain of the fine positioning actuator loop is dictated by the tracking accuracy desired and the track run-out or wobble which is allowed in the media. The coarse positioning loop gain is set at the required value in order to provide desired response times for the system seek time criteria when accessing tracks.

The ability of the system to capture or access a new track location when moving from a former track location is important. Thus, the characteristics of the fine actuator system and the coarse actuator system are important to this result. The comparatively low loop band width of the coarse actuator results in a much slower response time than that of the fine actuator. Thus, track acquisition, where data is read on the new track, is accomplished when the fine actuator has arrived at the new track location. Therefore, the system does not have to wait for the coarse actuator to stabilize in a final position before track accessing occurs. It may be necessary to stabilize the coarse system actuator before another track seek, but this is of no concern because the settling time of the coarse actuator will occur during the data access time required for any useful track following.

What is claimed is:

1. In an optical disk recording system having a radially movable optical system mounted on a fine tracking linear actuator carriage which is mounted on a primary coarse positioning linear actuator, which is in turn radially movable with respect to an optical recording media disk, the improvement comprising;

A servo control positioning system coupled to receive;
  (a) Optical system position signals derived from optically sensed tracking information on the optical media,
  (b) Position information derived from data information received from the optical recording media, and,
  (c) Further receiving information from a position sensing system, said position sensing system sensing the relative position of the fine tracking actuator vis-a-vis the coarse positioning actuator, said servo control positioning system controlling the movement of the fine tracking actuator through a first servo control loop and coarse positioning actuator through a second servo loop to position the optical system at a desired position, the servo control positioning system being operable to simultaneously position both the fine and coarse tracking position actuators by operating said first and second servo control loops in response to a difference between actual and desired optical system positions,
  wherein said position sensing system provides as an output, a signal indicating direction and magnitude of displacement between the relative positions of the fine tracking actuator and the coarse positioning actuator, and wherein said coarse positioning actuator is controlled by said position sensing system operating said second servo control loop to follow movements of said fine tracking system.

2. The servo control system of claim 1 wherein the fine tracking actuator is controlled by said first servo control loop having a bandwidth at least on order of magnitude greater than that of the second servo control loop controlling the coarse positioning actuator.

3. The servo control system of claim 1 wherein the bandwidth of the fine tracking actuator first servo control loop is such that it responds primarily to high frequency track following requirements.

4. The servo control system of claim 1 wherein the bandwidth of the coarse positioning actuator second servo control loop is such that it does not respond to high frequency track following requirements.

5. A servo control system for a data recording system comprising:
- a data recording system employing rotatable disk media having a system data acquisition head adapted to be positioned over the media disk,
- whereby said media is adapted to have each data track individually and uniquely addressable as the result of data address information on the data track and capable of producing track crossing information as the data head moves radially across data tracks,
- a small mass fine positioning actuator carrying the system data head in small movements with respect to the media,
- a coarse positioning actuator mounted and movable linearly in a radial direction with respect to the rotating media and having the fine positioning actuator mounted thereon,
- a position sensing means mounted on the coarse positioning actuator and biased to an arbitrary zero position for detecting the relative position between the fine positioning actuator and the coarse positioning actuator and having an output signal with direction and a magnitude information related to the relative positions of the fine positioning actuator and the coarse positioning actuator,
- a fine tracking compensation servo loop for receiving data from the data head concerning track addressing information and data track following information from said data head and for generating a control signal to drive said fine positioning actuator in small movements with respect to the media,
- a coarse positioning tracking compensation servo loop for receiving signals from said position sensing means and for generating signals to control the positioning of said coarse positioning actuator,
- microprocessor means for receiving signals from said data head for producing tracking status and track crossing detection signals and for controlling said fine positioning actuator when operating in a new track seeking drive mode, and
- switching means for switching the control of said fine positioning actuator from said fine tracking compensation servo loop to control by said microprocessor during a new data track seeking drive mode.

6. The servo control system of claim 5 wherein said position sensing system provides as an output a signal indicating direction and magnitude of displacement between the relative positions of the fine tracking actuator and the coarse positioning actuator and wherein said coarse positioning actuator is controlled by said position sensing system to follow movements of said fine tracking system.

7. The servo control system of claim 6 wherein the fine tracking actuator is controlled by a servo control loop having a bandwidth at least on order of magnitude greater than that of the servo control loop controlling the coarse positioning actuator.

8. The servo control system of claim 6 wherein the bandwidth of the fine tracking actuator servo control loop is such that it responds primarily to high frequency track following requirements.

9. The servo control system of claim 6 wherein the bandwidth of the coarse positioning actuator servo control loop is such that it does not respond to high frequency track following requirements.

10. A servo control system for an optical recording system comprising:
- A fine positioning actuator of comparatively small mass for carrying the system optical components in small movements with respect to the media,
- A coarse positioning actuator mounted and movable linearly with respect to the optical media and having the fine positioning actuator mounted thereon,
- A position sensing means mounted on the coarse positioning actuator for detecting the relative position of the fine positioning actuator vis-a-vis the coarse positioning actuator and having an output signal with direction and magnitude information related to the relative positions of the fine positioning actuator and the coarse positioning actuator,
- A fine tracking compensation servo loop for receiving information from the data head concerning track following information and for generating a control signal to drive said fine positioning actuator in small movements with respect to the media,
- A coarse positioning tracking compensation servo loop for receiving signals from said position sensing means and for generating signals to control the positioning of said coarse positioning actuator by following the movement of the fine positioning actuator,
- wherein said position sensing system provides an output signal indicating direction and magnitude of displacement between the relative positions of the fine tracking actuator and the coarse positioning actuator and wherein said coarse positioning actuator is controlled by said position sensing system to follow movements of said fine position system.

11. The servo control system of claim 10 wherein the fine tracking actuator is controlled by a servo control loop having a bandwidth at least on order of magnitude greater than that of the servo control loop controlling the coarse positioning actuator.

12. The servo control system of claim 10 wherein the bandwidth of the fine tracking actuator servo control loop is such that it responds primarily to high frequency track following requirements.

13. The servo control system of claim 10 wherein the bandwidth of the coarse positioning actuator servo control loop is such that it does not respond to high frequency track following requirements.

14. In a disk media-based information storage system having,
(a) a fine positioning actuator mounted on a coarse positioning actuator,
(b) data head signal decoder means for detecting and generating track centering information and detecting and generating track crossing information from input from said data head caused by modulations in said media,
(c) fine tracking compensation signal generating means coupled to said fine positioning actuator and responsive to said data head signal decoder means for generating signals appropriate to driving said fine position actuator to follow a particular information track on said media in a track following mode and to direct said fine positioning actuator to move said head in a given direction and a given acceleration in a track seek mode and, (d) an improved servo control system for positioning a data head over disk media information tracks wherein the improvement comprises:

A position sensor means capable of generating information output indicative of magnitude and direction of the positional displacement of said fine positioning actuator from a known point on said coarse positioning actuator mounting, and coarse track positioning compensation signal generating means coupled and responsive to said position sensor output for driving said coarse positioning actuator, such that said coarse positioning actuator follows the movement of said fine positioning actuator.

15. An improved servo control system as set forth in claim 14 wherein the data head signal decoder means comprises a track crossing detection means, a tracking error detection means and wherein said fine tracking compensation signal generating means includes a microprocessor responsive to these elements to generate fine position actuating signals during seek based on known response characteristics of the fine and coarse actuator systems and the known distances from current information track location to intended information track location.

16. An improved servo control system as set forth in claim 14 wherein said coarse positioning actuator is not responsive to high frequency signals generated by said position sensing means in response to track following movements of said fine actuator positioning movements.

17. An improved servo control system as set forth in claim 14 wherein said position sensor means comprises;

a light detection means having two portions, each capable of generating output indicative of the radiant energy received thereon, a light emitting means, and an opaque means having a slit-shaped opening and being located between said emitting and detecting means and attached to said fine actuator such that radially directed linear movement of said fine actuator drives said slit between said emitting and detecting means in such a manner to generate a signal from said portions, the differential of which is indicative of the magnitude and direction of said movement.

* * * * *